July 21, 1964 — R. J. DIKA — 3,141,449

INTERNAL COMBUSTION ENGINE

Filed Oct. 12, 1961 — 2 Sheets-Sheet 1

INVENTOR.
Robert J. Dika
BY George A. Schmidt
ATTORNEY

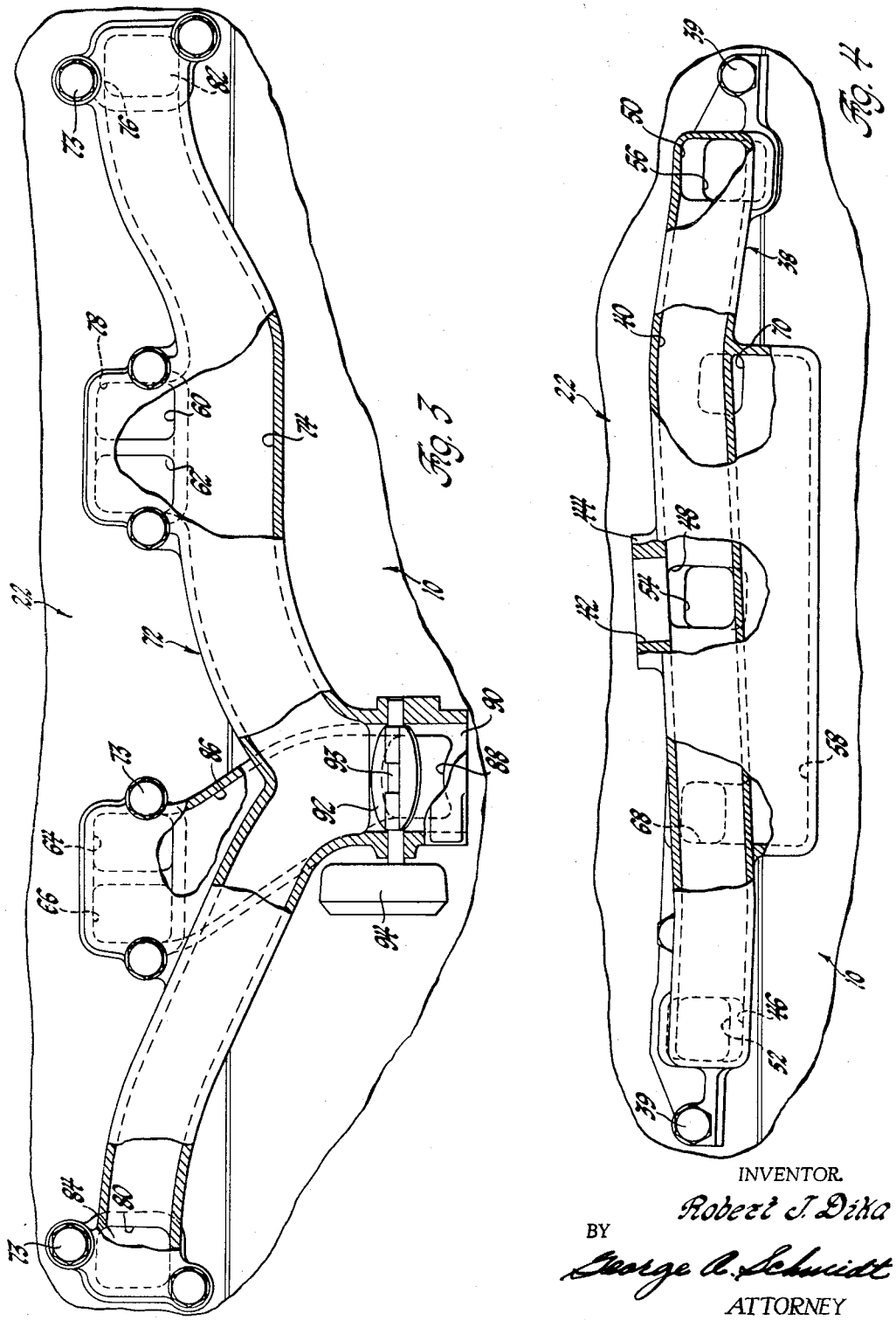

United States Patent Office 3,141,449
Patented July 21, 1964

3,141,449
INTERNAL COMBUSTION ENGINE
Robert J. Dika, Waterford, Mich., assignor to General Motors Corporation, Detroit, Mich., a corporation of Delaware
Filed Oct. 12, 1961, Ser. No. 144,627
3 Claims. (Cl. 123—122)

This invention relates to internal combustion engines, and more particularly to an intake manifold heating means for an internal combustion engine.

In the design and manufacture of internal combustion engines, where the cylinders are disposed in a row in the engine block, it may be desirable to place the intake manifold and exhaust manifold on opposite sides of the cylinder head. Under these conditions it is extremely difficult to provide an economical means for heating the intake manifold to properly prepare the air-fuel mixture prior to its entry into the engine cylinders.

In the past it has been the practice to provide extremely complicated exhaust piping systems from the exhaust manifold, over, around or under the remainder of the engine, to a point adjacent the intake manifold to provide the intake manifold heating. This requires a great amount of excess material, either in the form of cast iron systems or steel tubing, or the like. This is an expensive method of providing intake manifold heating. Furthermore, space considerations in the engine compartment of a motor vehicle often restrict the use of external means for intake manifold heating.

The device in which this invention is embodied comprises, generally, an intake manifold heating system utilizing a circulation system through the engine cylinder head from the exhaust manifold to the intake manifold and back. This is accomplished by means of passages completely through the cylinder head communicating with an intake manifold heating passage which carries exhaust gases along the intake manifold adjacent the induction system inlet. The exhaust gases are returned through passages in the cylinder head to the exhaust manifold where they may be conveyed to the outside in the usual manner.

With this type of intake manifold heating, it is unnecessary to provide complicated and cumbersome external exhaust gas conveying means from one side of the engine to the other. The normal cylinder head is utilized in such a manner as to provide an extremely economical yet well designed internal combustion engine.

These and other advantages will become more apparent from the following description and drawings, in which.

Figure 1:
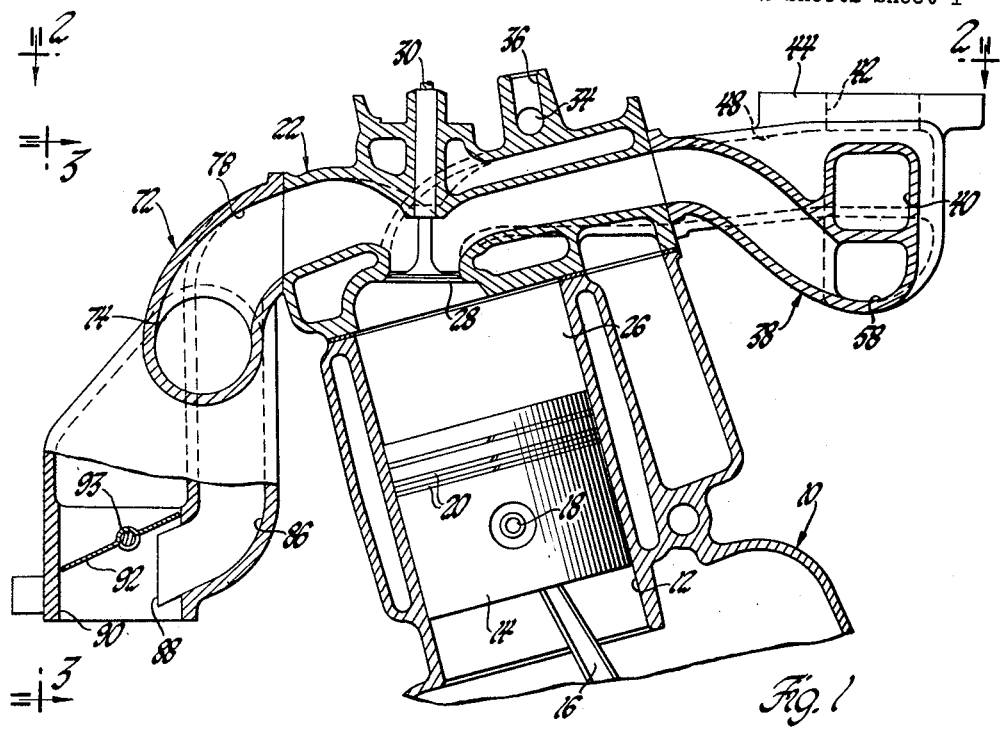
FIGURE 1 is a view of a portion of an internal combustion engine with parts broken away and in section to illustrate the exhaust heat circulating system from the exhaust manifold to the intake manifold.
Figure 2:
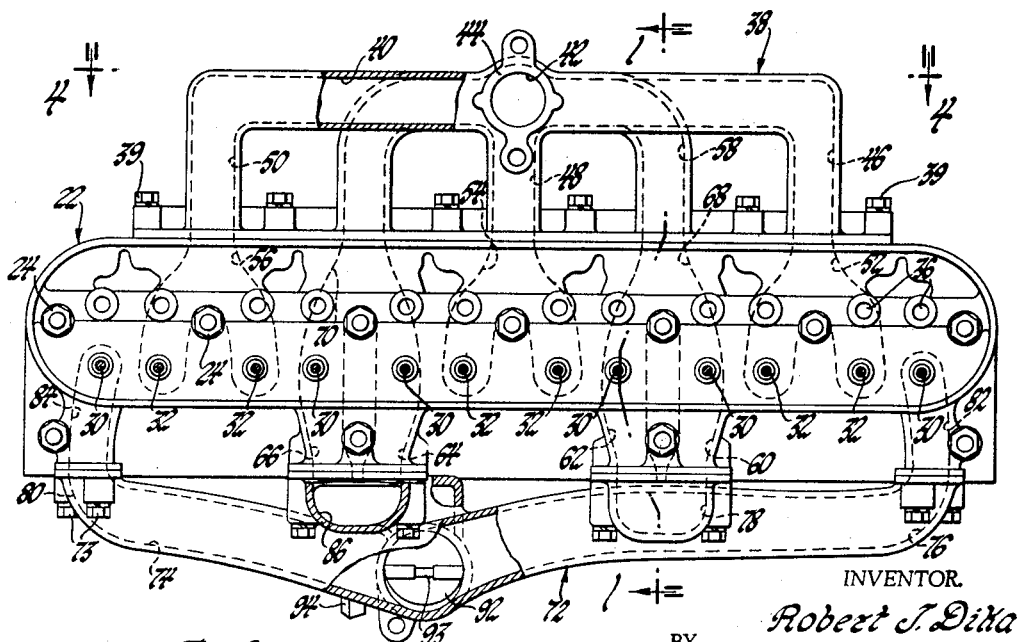
FIGURE 2 is a plan view of the engine illustrated in FIGURE 1 showing the intake and exhaust manifolds, and taken substantially along the line 2—2 of FIGURE 1 and looking in the direction of the arrows.

FIGURE 3 is an elevational view of the exhaust manifold of the engine of FIGURES 1 and 2 taken substantially along the line 3—3 of FIGURE 1 and looking in the direction of the arrows; and FIGURE 4 is an enlarged view of the intake manifold of the engine illustrated in FIGURES 1 and 2 taken substantially along the line 4—4 of FIGURE 2.

Referring more particularly to the drawings, FIGURES 1 and 2 best illustrate the internal combustion engine in which this invention is embodied. An engine block, illustrated generally by the numeral 10, is provided with the usual cylinders 12 in which are reciprocably mounted pistons 14. Piston rods 16, connected to the pistons 14 by wrist pins 18, are secured in the usual manner to a crankshaft, not shown. Piston rings 20 are provided in suitable grooves in the piston in the usual manner.

Mounted above the engine block 10 is a cylinder head, illustrated generally by the numeral 22. Cylinder head 22 is secured to block 10 in any suitable manner, as by bolts 24, as seen in FIGURE 2. The cylinder head 22 closes the top of the cylinder 12 to provide a combustion chamber 26 in which are disposed the usual exhaust valves 28 and intake valves, not shown. Exhaust valve stems 30 and intake valve stems 32, as seen in FIGURE 2, extend through the cylinder head 22 to the usual valve drive means, not shown, which may take the form of rocker arms or the like actuated by a suitable camshaft. An oil gallery 34 is provided in the cylinder head 22 and passages 36 convey lubricating oil to the rocker arm gallery located above the cylinder head 22.

The cylinders 12 are disposed in the engine block 10 such that intake and exhaust valves are paired in the cylinder head 22. This is best illustrated by noting in FIGURE 2 the respective pairs of intake valve stems 32 and exhaust valve stems 30 in the cylinder head 22. Each adjacent pair of exhaust valves and intake valves indicates the position of the respective cylinders.

Mounted adjacent the cylinder head 22 and at one side of the engine block 10 is an intake manifold, illustrated generally by the numeral 38, secured to cylinder head 22 as by bolts 39. Intake manifold 38 includes a longitudinal passage 40 which is in communication with an induction system inlet 42 through a suitable carburetor mounting pad 44. Branch passages 46, 48 and 50 extend from longitudinal passage 40 toward the cylinder head 22. In cylinder head 22 a plurality of Y-shaped cavities 52, 54 and 56 are provided, each of the Y-shaped cavities communicating with separate cylinders 12 in the engine block 10. As illustrated in FIGURE 2, each of the intake valve stems 32 is disposed in one of the arms of the Y-shaped cavities 52, 54 or 56. Thus, the intake induction system constitutes longitudinal passage 40, branch passages 46, 48 and 50, and Y-shaped cavities 52, 54 and 56. Intake valves, represented by valve stems 32 in FIGURE 2, open into the combustion chambers 26 at the proper time in the piston cycle.

Forming an integral part of intake manifold 38 is an exhaust heat passage 58. Passage 58 extends from the cylinder head 22, passes under the longitudinal passage 40 at the induction system inlet 42, and returns to the cylinder head 22, as illustrated in FIGURE 2. The purpose of exhaust heat passage 58 is to convey warm exhaust gases, in a manner to be later described, to the point in the intake manifold adjacent the induction system inlet 42 to warm the incoming air-fuel mixture for proper induction to the engine cylinders.

In cylinder head 22 are formed a plurality of passages 60, 62, 64 and 66. These pairs of passages communicate with the various combustion chambers 26 through exhaust valves 28 in such a manner that each passage serves the inner four cylinders of the engine illustrated. Passages 60 and 62 merge into passage 68 which communicate with exhaust heat passage 58 in the intake manifold 38, and passages 64 and 66 merge into a single passage 70 communicating with the return of exhaust heat passage 58. The purpose for the exhaust flow through these passages will become hereinafter more apparent.

Mounted adjacent cylinder head 22 and at the opposite side thereof from intake manifold 38 is an exhaust manifold, illustrated generally by the numeral 72. Manifold 72 is secured to cylinder head 22 in any suitable manner, as by bolts 73. Exhaust manifold 72 includes a longitudinal passage 74 and a plurality of branch passages 76, 78 and 80, which communicate with passages in the cylinder head 22. Branch passage 76 communicates with passage 82 leading to the exhaust valve 28 at one end of cylinder head 22, and branch passage 80 leads to a similar passage 84 at the opposite end of the cylinder head 22. Branch passage 78 communicates with the pair of passages 60 and 62 in the cylinder head 22. Adjacent the passages 64 and 66 through the cylinder head 22 is a passage 86 which leads to an exhaust outlet 88, to which is connected the usual exhaust pipe for conveying the exhaust to the atmosphere.

A second outlet passage 90 extends from longitudinal passage 74 and contains a thermostatically controlled valve 92 mounted on a suitable pivot 93 in passage 90. A thermostatic control of any suitable type 94 is connected to pivot shaft 93 for controlling the position of valve 92 in accordance with the engine temperature. Thermostatic control 94 may take the form of a bimetallic element adapted to uncoil with heat in order to open valve 92.

The normal operation of the above-described system is as follows. When the engine is first started and under such conditions that valve 92 is closed, it is at this point desirable to heat the incoming air-fuel mixture. As the engine is started exhaust gases are expelled from the various cylinders through the exhaust valves 28 and into passages 82, 60, 62, 64, 66 and 84 in the cylinder head 22. The gases in passages 82 and 84 flow into the longitudinal passage 74 of the exhaust manifold 72 and are blocked from outlet 90 by the valve 92. The gases are induced to flow through passage 78 into passages 60 and 62 where they join the passage 68, and into the intake manifold heating passage 58. The exhaust gases then warm the intake manifold adjacent the induction system inlet 42 and are conveyed through passage 58 to passage 70, passages 64 and 66, and into outlet passage 86 where they pass out of the system through passage 88. This flow continues until the thermostatic control 94 reaches its predetermined temperature and causes valve 92 to open. The exhaust gases from passages 82 and 84 and the gases from passages 60 and 62 are induced to flow into longitudinal passage 74 and out of the system past valve 92 through the outlet passage 90. The exhaust from passages 64 and 66 continues to flow through the outlet passage 88. In this manner the flow ceases through the intake manifold heating passage 58 and is induced directly through the exhaust manifold 72 to the normal exhaust pipe system. When the engine is shut down and allowed to cool, the thermostatic control 94 again closes valve 92 so that when the engine is started the intake manifold will be properly heated.

Thus, an intake manifold heating system is provided which utilizes passages formed through the cylinder head thus eliminating the bulky and cumbersome external exhaust conveying means normally used with such engines. The resulting construction is extremely economical, relatively simple to manufacture, and existing engines may be modified in order to utilize this system.

What is claimed is:

1. In an internal combustion engine having an engine block containing a row of cylinders;

a cylinder head mounted on said block and having intake valves and exhaust valves therein opening into said cylinders, said intake valves being disposed in pairs along the length of said cylinder head and the inner of said exhaust valves being disposed in pairs between said pairs of intake valves, said cylinder head having a plurality of Y-shaped intake passages therein, the base of each of said passages opening through one wall of said cylinder head and each of the arms of each of said passages communicating with one of said cylinders through one of said intake valves, said cylinder head further having a pair of Y-shaped exhaust passages therethrough, the base of each of said exhaust passages opening through said one wall of said cylinder head and each of the arms of said Y-shaped exhaust passages communicating with one of said cylinders through said exhaust valves and said arms opening through another wall of said cylinder head;

an intake manifold secured to said cylinder head and along said one wall thereof and having a longitudinal passage and a plurality of branch passages, each of said branch passages communicating with the base of one of said Y-shaped passages and with said longitudinal passage, fuel and air inlet means in said intake manifold and communicating with said longitudinal passage, said intake manifold having an exhaust heat passage communicating between the bases of said Y-shaped exhaust passages and passing adjacent said fuel and air inlet means;

an exhaust manifold attached to said cylinder head and along said another wall thereof, said exhaust manifold having a longitudinal passage formed therein and a plurality of branch passages therein communicating between said longitudinal passage and said cylinder head, one of said branch passages connecting said arms of one of said Y-shaped exhaust gas passages through said cylinder head, first exhaust gas outlet means formed in said exhaust manifold and communicating with the arms of the other of said Y-shaped exhaust gas passages through said cylinder head, said exhaust manifold having second exhaust gas outlet means communicating with said longitudinal passage;

and a thermostatically controlled valve in said second exhaust gas outlet means, said valve being operative to direct exhaust gases through said longitudinal passage and through said one of said Y-shaped exhaust gas passages in said cylinder head and through said exhaust heat passage in said inlet manifold and through said other of said Y-shaped exhaust gas passages in said cylinder head and out of said first outlet means in said exhaust manifold to heat the incoming fuel and air mixture when the exhaust gases are below a predetermined temperature and to direct exhaust gases directly out of said second exhaust outlet means when the exhaust gases are above a predetermined temperature.

2. A cylinder head for an internal combustion engine having an engine block containing a row of cylinders and comprising:

a frame adapted to be mounted on said block and having a plurality of intake valves and exhaust valves therein adapted to open into said cylinders;

said intake valves being disposed in pairs along the length of said frame and the inner of said exhaust valves being disposed in pairs between said pairs of intake valves;

said frame having a Y-shaped intake passage therein for each of said pairs of intake valves, the base of each of said passages opening through one wall of said frame, each of the arms of each of said passages communicating with one of said cylinders through one of said intake valves;

said frame having a Y-shaped exhaust passage formed therethrough for each of said pairs of exhaust valves, the base of each of said exhaust passages opening through said one wall of said frame, each of the arms of said Y-shaped exhaust passages communicating with one of the inner of said cylinders through said exhaust valves, said arms of said Y-shaped exhaust passages opening through another wall of said frame;

said one wall of said frame being formed to receive an intake manifold for conveying an air-fuel mixture to said Y-shaped intake passages;

and said another wall of said frame being formed to receive an exhaust manifold for passing exhaust gases to one of said Y-shaped exhaust passages and from the other of said Y-shaped exhaust passages.

3. In an internal combustion engine having an engine block containing a row of cylinders;

a cylinder head mounted on said block and having intake valves and exhaust valves therein opening into said cylinders, said intake valves being disposed in pairs along the length of said cylinder head and the inner of said exhaust valves being disposed in pairs between said pairs of intake valves, said cylinder head having a plurality of Y-shaped intake passages therein, the base of each of said passages opening through one wall of said cylinder head and each of the arms of said passages communicating with one of said cylinders through one of said intake valves, said cylinder head further having a plurality of Y-shaped exhaust passages therethrough, the base of each of said exhaust passages opening through said one wall of said cylinder head and each of the arms of said Y-shaped passages communicating with one of said cylinders through one of said exhaust valves and said arms opening through another wall of said cylinder head;

an intake manifold secured to said cylinder head and along said one wall thereof, fuel and air inlet means in said intake manifold and communicating with said Y-shaped intake passages, said intake manifold having an exhaust heat passage communicating between the bases of said Y-shaped exhaust passages and passing adjacent said fuel and air inlet means;

and an exhaust manifold attached to said cylinder head and along said another wall thereof, first exhaust gas outlet means formed in said exhaust manifold and communicating with the arms of one of said Y-shaped exhaust gas passages through said cylinder head, said exhaust manifold having second exhaust gas outlet means communicating with the other of said Y-shaped exhaust gas passages.

References Cited in the file of this patent
UNITED STATES PATENTS

| | | |
|---|---|---|
| 1,634,971 | Angle et al. | July 5, 1927 |
| 1,998,636 | Porter | Apr. 23, 1935 |
| 2,888,001 | Morrish | May 26, 1959 |
| 3,019,781 | Kolbe | Feb. 6, 1962 |